(12) United States Patent
Cho

(10) Patent No.: US 8,265,101 B2
(45) Date of Patent: Sep. 11, 2012

(54) SYNCHRONIZATION CONTROL DEVICE OF SLAVE DEVICES CONNECTED TO NETWORK AND METHOD THEREOF

(75) Inventor: Myoung Chol Cho, Anyang-si (KR)

(73) Assignee: LS Industrial Systems Co., Ltd., Anyang-Si (KR)

( * ) Notice: Subject to any disclaimer, the term of this patent is extended or adjusted under 35 U.S.C. 154(b) by 318 days.

(21) Appl. No.: 12/579,349

(22) Filed: Oct. 14, 2009

(65) Prior Publication Data

US 2010/0166022 A1 Jul. 1, 2010

(30) Foreign Application Priority Data

Dec. 31, 2008 (KR) ........................ 10-2008-0138837

(51) Int. Cl.
*H04J 3/06* (2006.01)
*H04L 7/00* (2006.01)
(52) U.S. Cl. .................. 370/503; 375/354; 375/356
(58) Field of Classification Search .................. 370/352, 370/356, 401, 503; 375/356, 354; 700/42, 700/86; 455/208, 265
See application file for complete search history.

(56) References Cited

U.S. PATENT DOCUMENTS

| | | | |
|---|---|---|---|
| 2008/0159270 A1* | 7/2008 | Burke et al. | 370/352 |
| 2009/0016475 A1* | 1/2009 | Rischar et al. | 375/356 |
| 2009/0177295 A1* | 7/2009 | Niemi | 700/42 |
| 2009/0234471 A1* | 9/2009 | Chandhoke | 700/86 |
| 2009/0323704 A1* | 12/2009 | Hall et al. | 370/401 |
| 2010/0111113 A1* | 5/2010 | Wong et al. | 370/503 |

OTHER PUBLICATIONS

Rehnman et al., "Synchronization in a Force Measurement System Using EtherCAT," Proceedings of IEEE International Conference on Emerging Technologies and Factory Automation, pp. 1023-1030, Sep. 2008.

* cited by examiner

*Primary Examiner* — Michael Thier
*Assistant Examiner* — Awet Haile
(74) *Attorney, Agent, or Firm* — Lee, Hong, Degerman, Kang & Waimey

(57) ABSTRACT

The present disclosure relates to a synchronization control device and method of slave devices connected to a network capable of synchronizing operations of the slave devices, wherein a communication module generates a first synchronization signal and a second synchronization signal according to a distributed clock function, generating, by a processor, a control data for driving an actuator according to the first synchronization signal, outputting to a driver the control data if a synchronization interrupt is generated by the first synchronization signal, and inputting and processing, by the processor, a reception data of the communication module to generate the control data, and generating a timer interrupt on a period set up by a timer according to control of the processor, and generating, by the processor, the control data to output the generated control data to the driver if the first synchronization signal is not generated but the timer interrupt is generated.

9 Claims, 10 Drawing Sheets

SYNCHRONIZATION CONTROL DEVICE OF SLAVE DEVICES CONNECTED TO NETWORK AND METHOD THEREOF

CROSS-REFERENCE TO RELATED APPLICATION

The present application is based on, and claims priority from, Korean Application Numbers 10-2008-0138837, filed Dec. 31, 2008, the disclosure of which is incorporated by reference herein in its entirety.

BACKGROUND

The present disclosure relates to a synchronization control device of slave devices connected to a network capable of mutually synchronizing operations of a plurality of slave devices connected to the network, and a method thereof. To be more specific, the present disclosure relates to a synchronization control device of slave devices connected to a network capable of synchronizing control period of a processor mounted at a plurality of slaves connected to the network, and synchronizing operations of drivers for driving actuators using control of the processor, and a method thereof.

SUMMARY

In general, a factory automation system is operated by directly connecting input/output level devices. Recently, mutual communication is enabled by connecting a plurality of devices via a network due to development of communication techniques, installation conveniences and cost reduction.

The EtherCAT (Ethernet for Control Automation Technology) network, one of the networks connecting a plurality of devices, is one type of industrial EtherCAT capable of swiftly updating data and performing a synchronization control among the plurality of devices.

The conventional EtherCAT network comprises a master device and a plurality of slave devices. The master device uses a standard Ethernet integrated element as a communication module, and the plurality of slave devices uses an exclusive EtherCAT ASIC (Application Specific Integrated Circuit) as a communication module.

The EtherCAT network uses a distributed clock function for synchronizing operations of the plurality of slave devices. The distributed clock function is realized by a synchronization signal of the EtherCAT ASIC which is a communication module mounted at each slave device.

However, although the plurality of slave devices is synchronized by the synchronization signal generated by the communication module in response to the distributed clock function, processors each mounted at the plurality of slave devices for processing a reception data and a driver for driving an actuator in response to the control of the processor are operated by a separate clock signal.

As a result, there is a disadvantage in that operations of the processors each mounted at the plurality of slave devices are not synchronized and the actuators driven by the drivers each mounted at the plurality of slave devices are not synchronized either.

The present disclosure is therefore disclosed to solve the disadvantages thus mentioned by providing a synchronization control device of slave devices connected to a network capable of synchronizing operations of processors each mounted at a plurality of slave devices for processing data transmitted from a master device, and a method thereof.

The present disclosure also provides a synchronization control device of slave devices connected to a network capable of improving control preciseness by synchronizing operations of drivers for driving each actuator by a plurality of processors each mounted at a plurality of slave devices, and a method thereof.

The present disclosure may, however, be embodied in many different forms and should not be construed as limited to the embodiments set forth herein. Rather, these embodiments are provided so that this disclosure will be thorough and complete, and will fully convey the scope of the general inventive concept to those skilled in the art.

DETAILED DESCRIPTION

Figure 1:
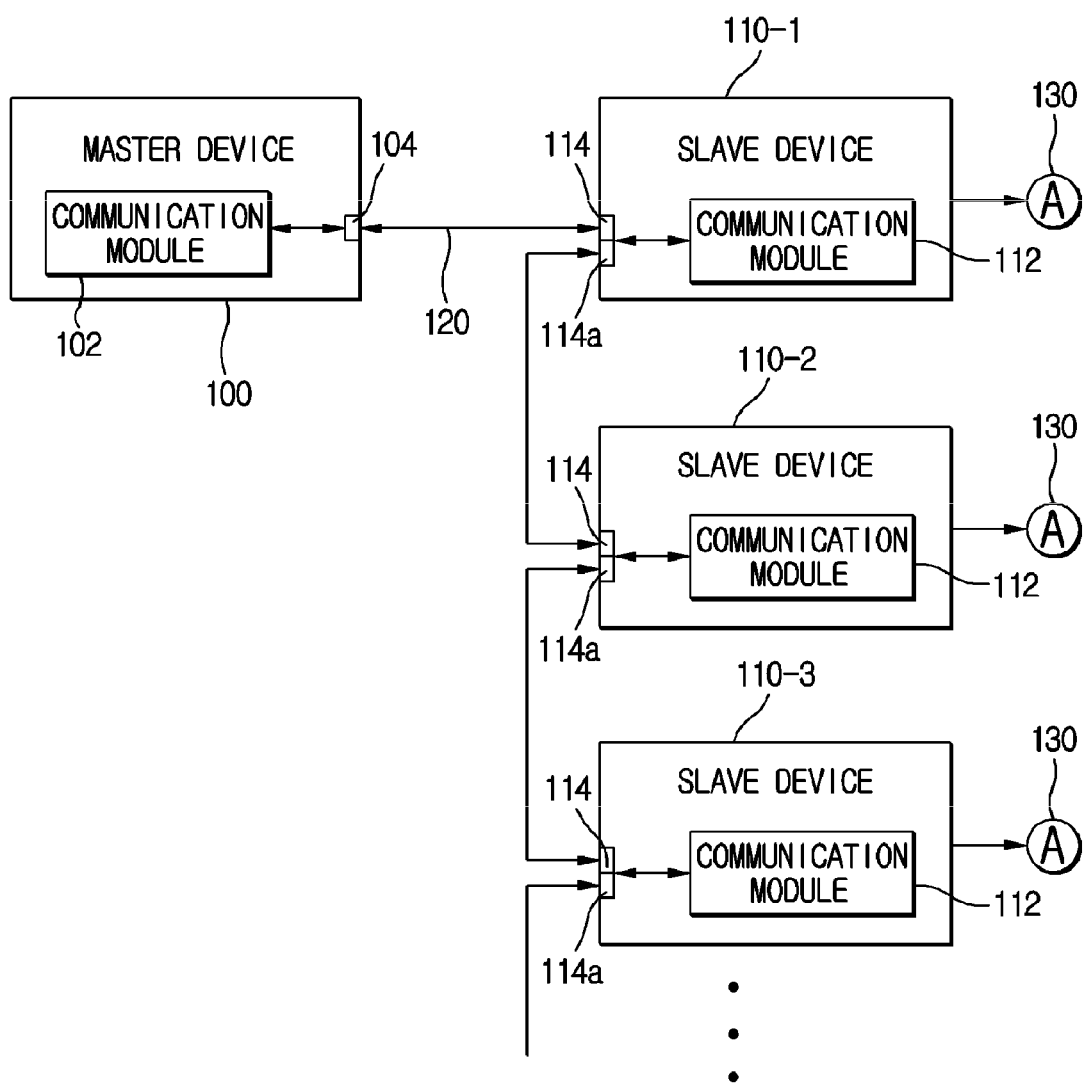
FIG. 1 is a schematic view of a low noise amplifier circuit in tuner according to an exemplary embodiment of the present invention.

Reference will now be made in detail to the embodiments of the present disclosure, examples of which are illustrated in the accompanying drawings, wherein like reference numerals refer to the like elements throughout.

FIG. 1 is a schematic view of construction of an EtherCAT network.

Figure 2:
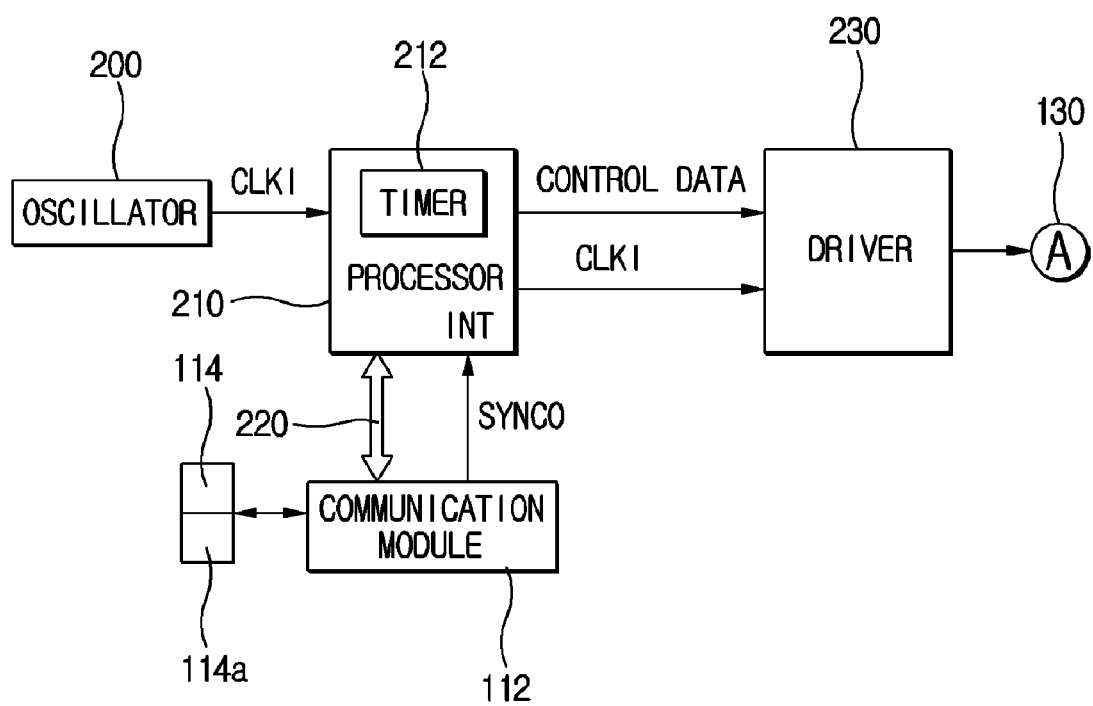

FIG. 2 is a schematic view of construction of a plurality of slave devices.

Figure 3:
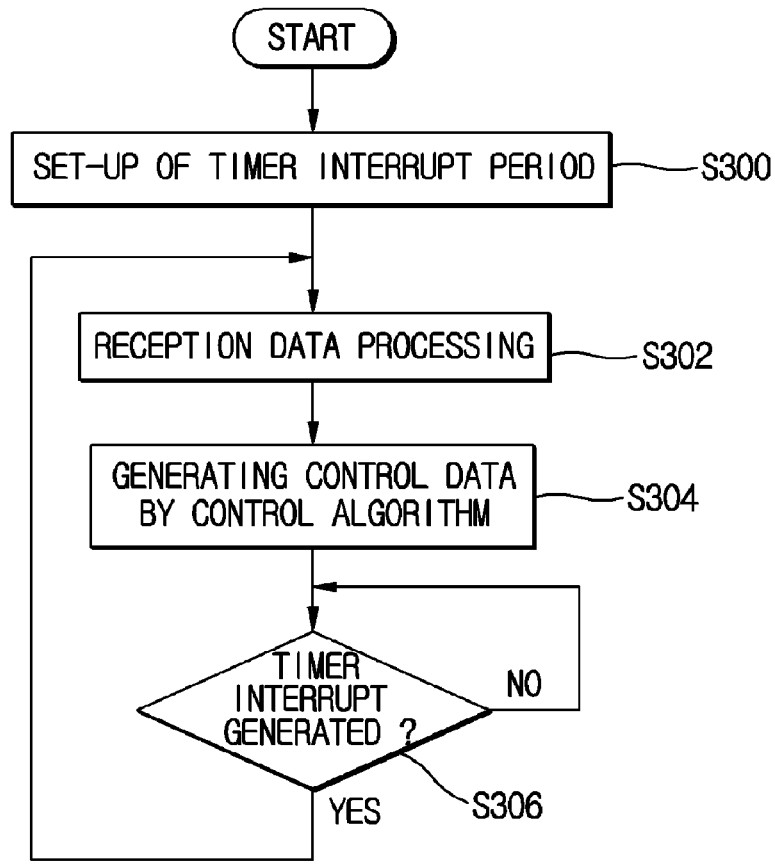

FIG. 3 is a signal flowchart illustrating an operation of a processor in FIG. 2.

Figure 4:
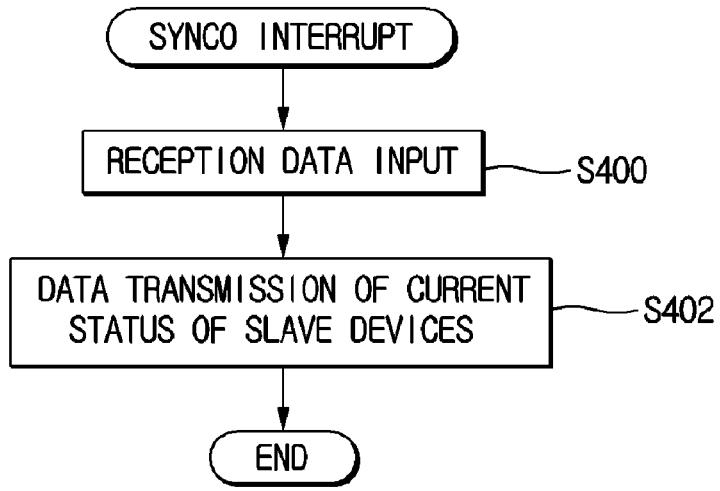

FIG. 4 is a signal flowchart illustrating an synchronization interrupt operation performed by a process of FIG. 2.

Figure 5:
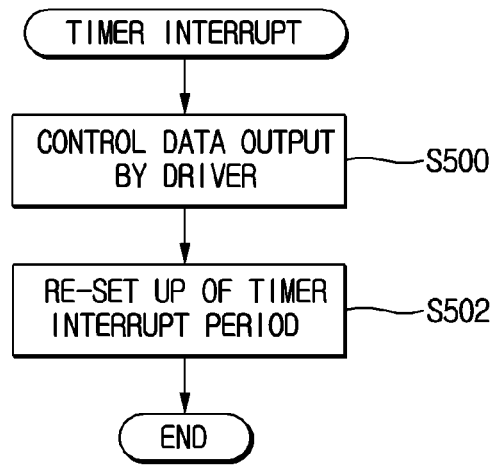

FIG. 5 is a signal flowchart illustrating a timer interrupt operation performed by the processor of FIG. 2.

Figure 6:
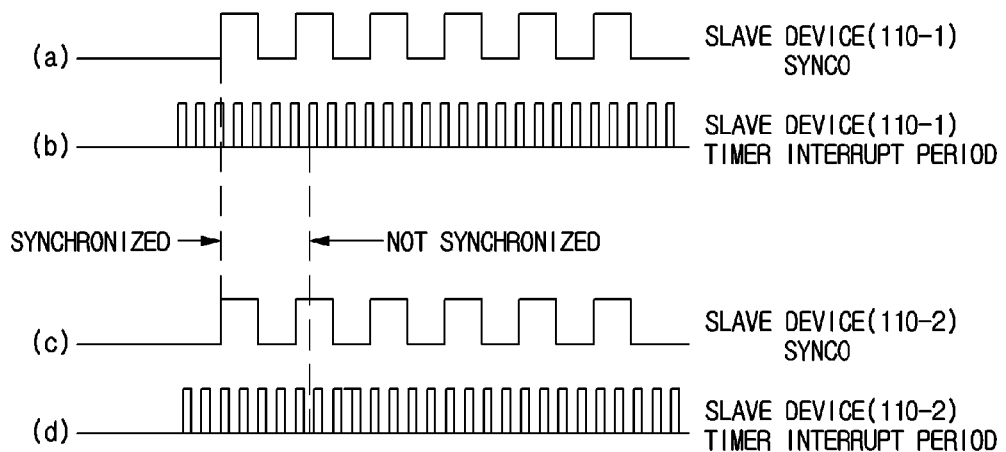

FIG. 6 is a schematic view explaining control periods of processors each mounted at a plurality of slave devices, where each control period of the processor is not synchronized.

Figure 7:
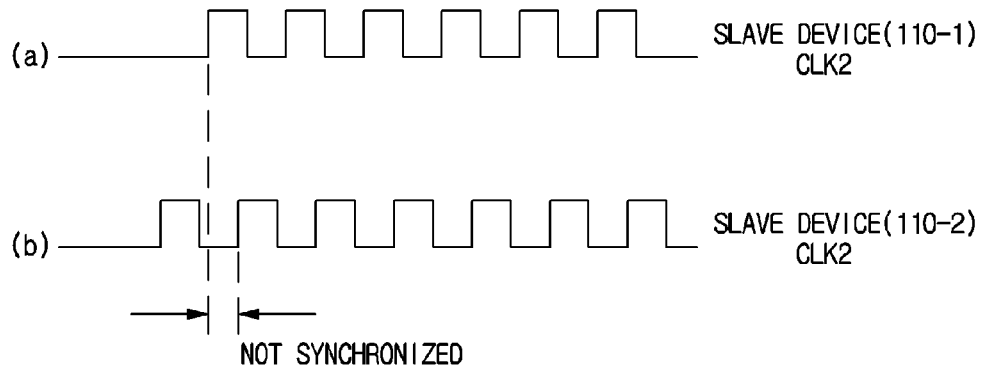

FIG. 7 is a schematic view explaining clock signals of drivers each mounted at a plurality of slave devices, where each clock signal of the driver is not synchronized.

Figure 8:
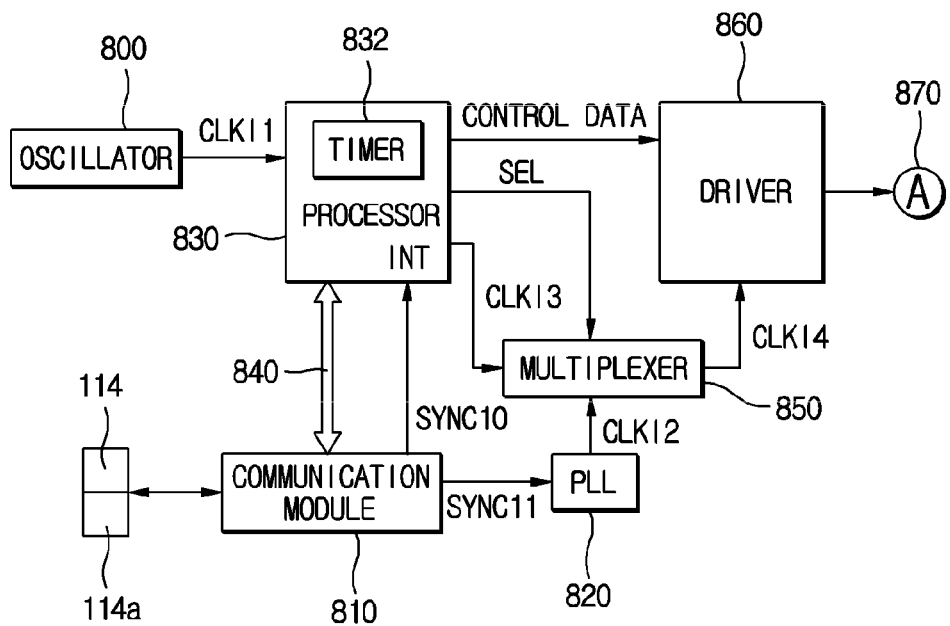

FIG. 8 is a schematic structural view of a slave device in a synchronization control device according to an exemplary embodiment of the present disclosure.

Figure 9:
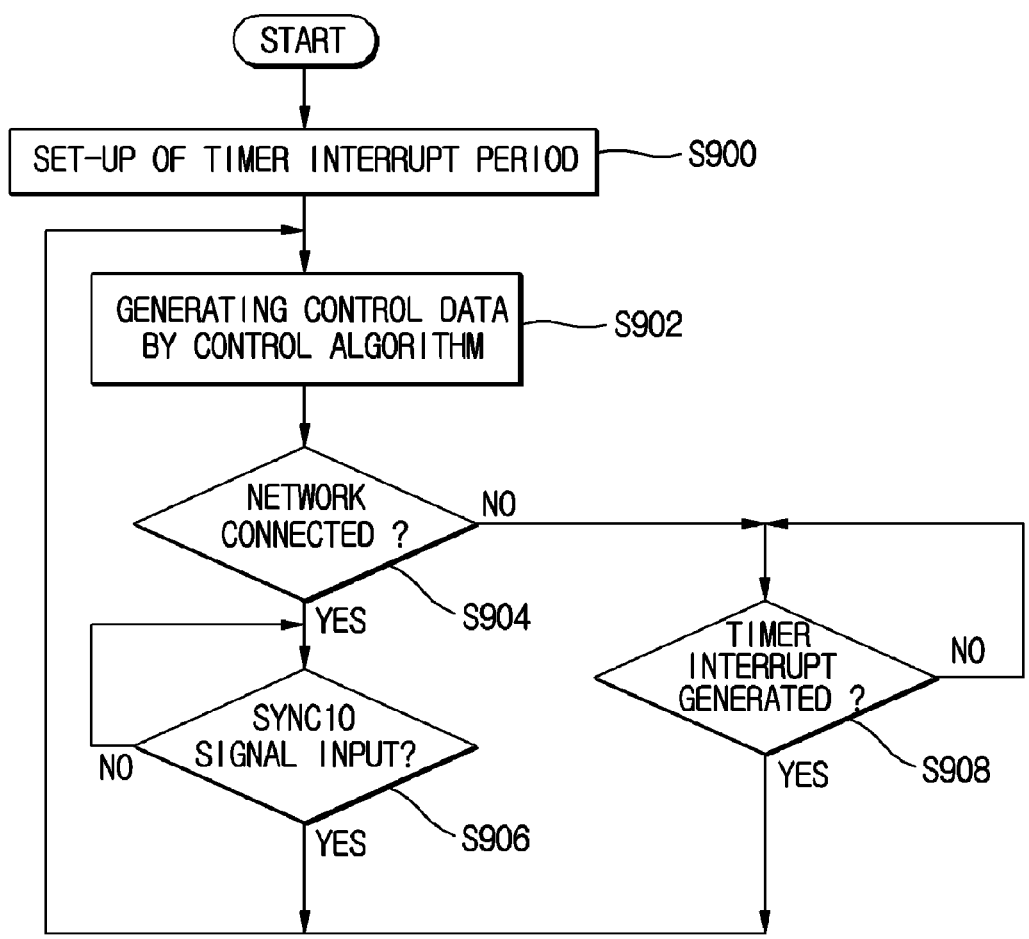

FIG. 9 is a signal flowchart illustrating an operation of a processor according to a synchronization control method of the present disclosure.

Figure 10:
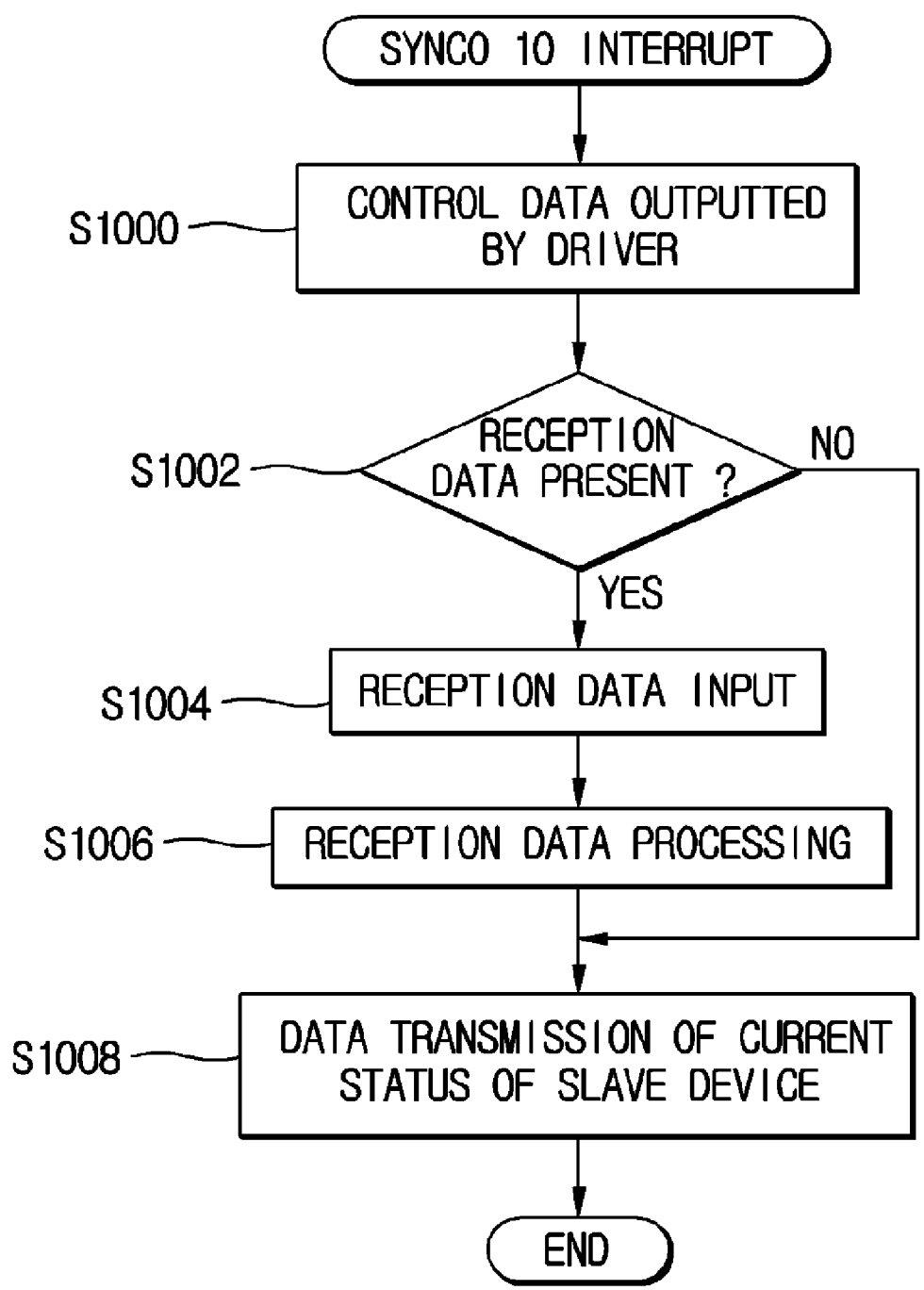

FIG. 10 is a signal flowchart illustrating a synchronization interrupt operation of a processor according to a synchronization control method of the present disclosure.

Figure 11:
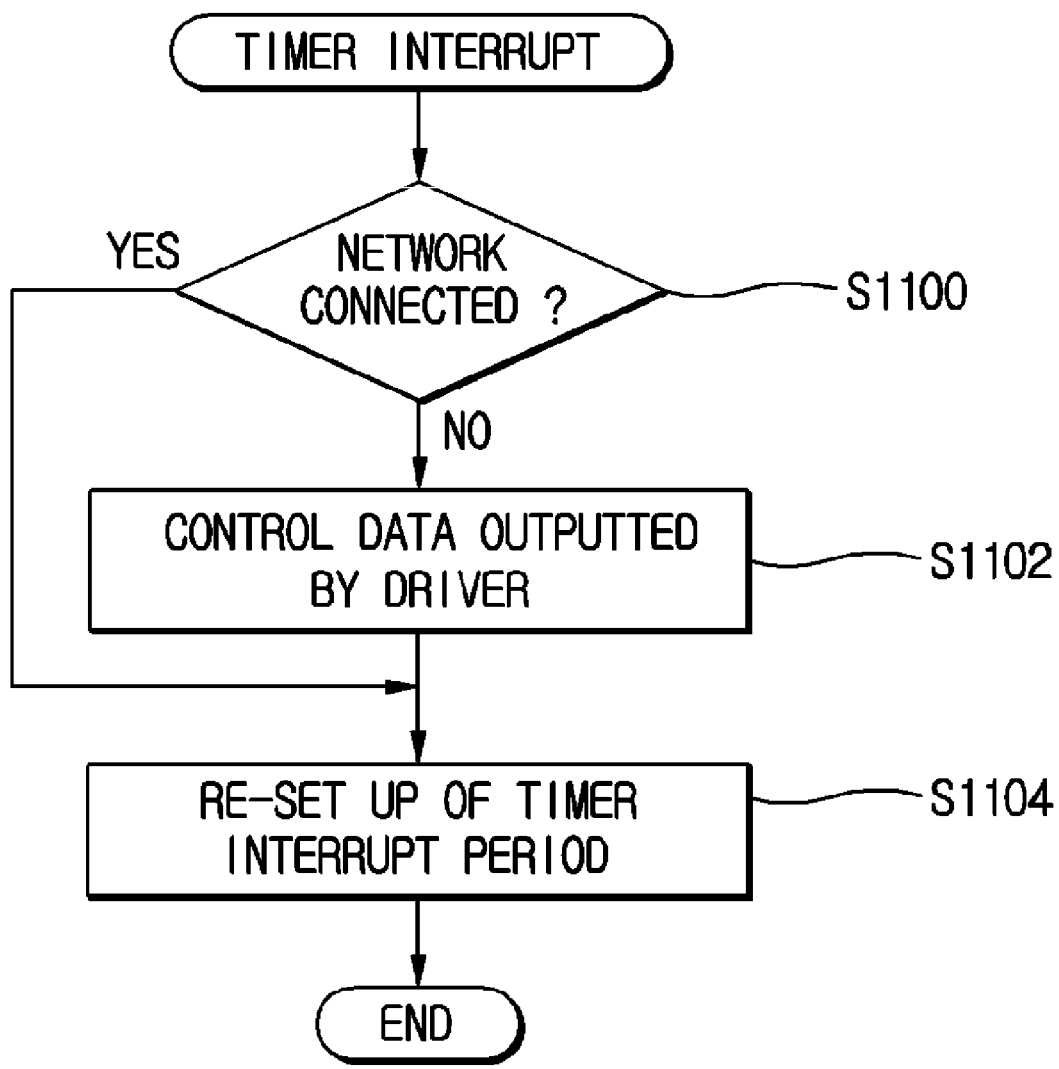

FIG. 11 is a signal flowchart illustrating a timer interrupt operation of a processor according to a synchronization control method of the present disclosure.

Figure 12:
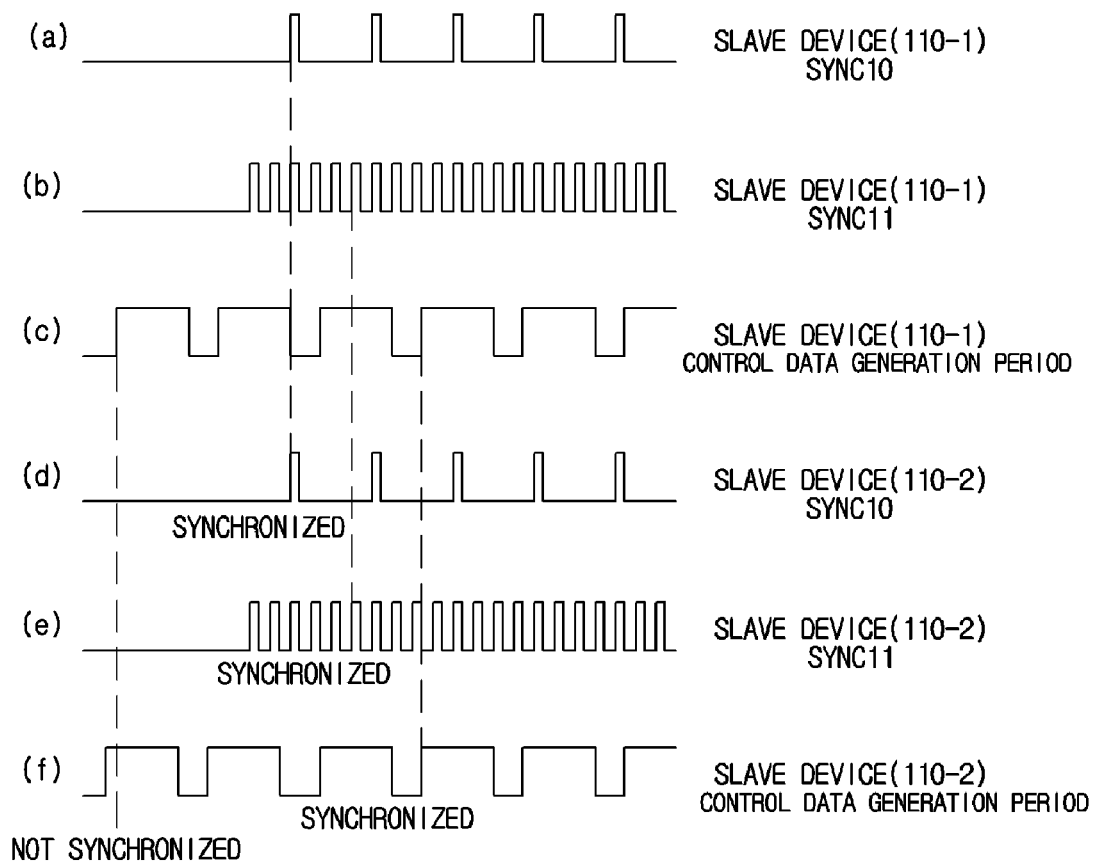

FIG. 12 is a schematic view illustrating synchronized operations of processors each mounted at a plurality of slave devices according to the present disclosure.

Figure 13:
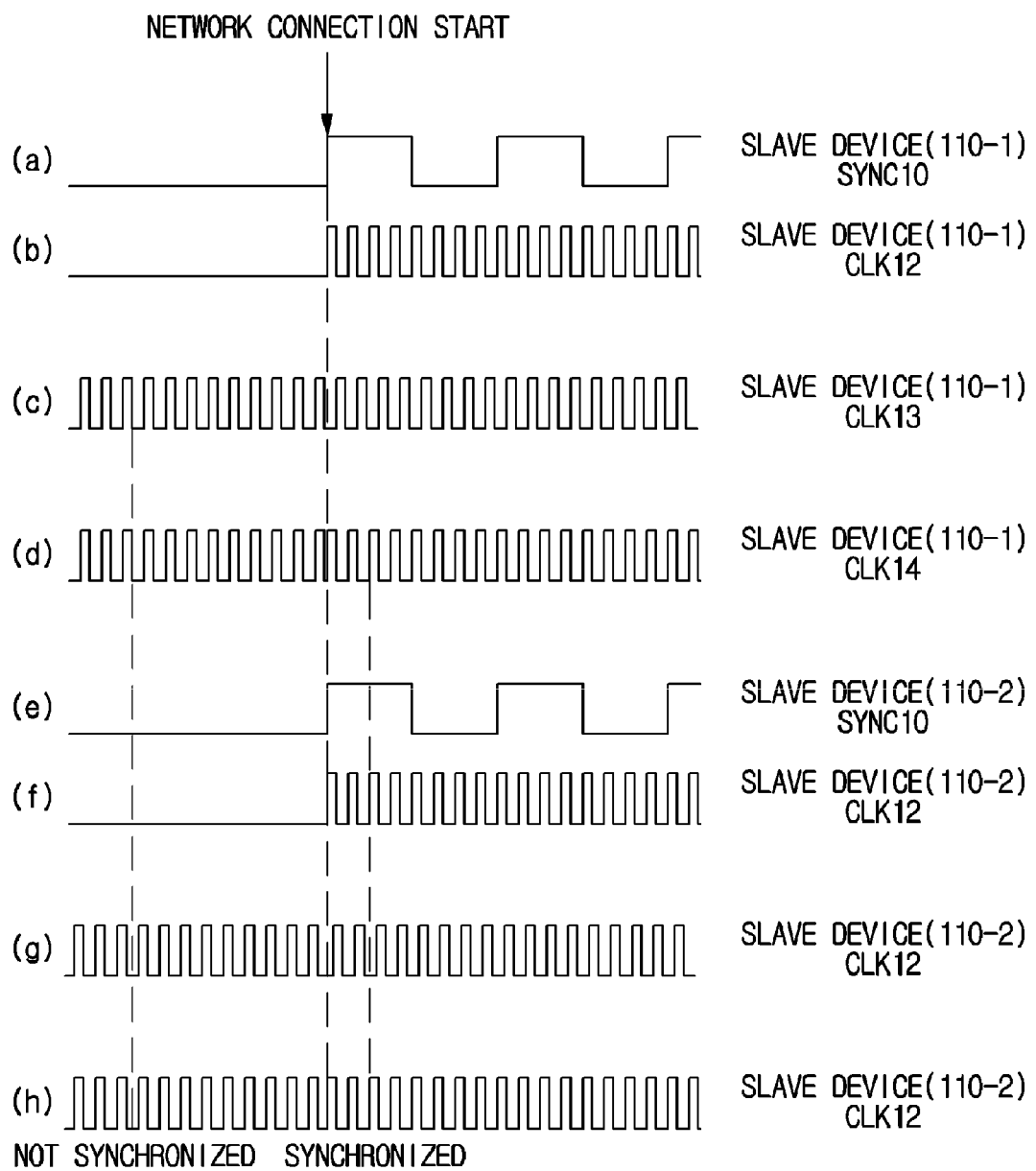

FIG. 13 is a schematic view illustrating synchronized clock signals of drivers each mounted at a plurality of slave devices according to the present disclosure.

DETAILED DESCRIPTION OF THE INVENTION

The particular embodiment disclosed above is illustrative only, as the disclosure may be modified and practiced in different but equivalent manners apparent to those skilled in the art having the benefit of the teachings herein. The embodiments are also described below in order to explain the present disclosure by referring to the figures. The present disclosure may, however, be embodied in many different forms and should not be construed as limited to the embodiments set forth herein. Rather, these embodiments are provided so that this disclosure will be thorough and complete, and will fully convey the scope of the general inventive concept to those skilled in the art.

For the purpose of clarity, technical material that is known in the technical fields related to the disclosure has not been described in detail so that the disclosure is not unnecessarily obscured. The terms and phrases therefore should be defined based on the contents across an entire specification.

Configuration of an EtherCAT network is shown referring to FIG. 1, where reference numeral 100 is a master device, and reference numeral 110 (110-1, 110-2, 110-3, . . . ) defines a plurality of slave devices. The master device 100 and the plurality of slave devices each embedded therein with communication modules 102, 112 for performing data communication.

For example, the master device 100 is mounted with a standard EtherCAT integrated element as the communication module 102. The plurality of slave devices 110 is mounted with an exclusive EtherCAT ASIC as the communication module 112 for performing mutual data communication.

The master device 100 is mounted with one input/output port 104. The slave device 110 is mounted with two input/output ports 114, 114a respectively.

The one input/output port 104 mounted at the master device 100 and the two input/output ports 114, 114a each mounted at the plurality of slave devices 110 are connected in series via a communication cable 120.

For example, the one input/output port 104 mounted at the one master device 100 is connected to the input/output port 114 of the slave device 110-1 via the communication cable 120. The input/output port 114a of the slave device 110-1 is connected to the input/output port 114 of the slave device 110-2 via the communication cable 120. The input/output port 114a of the slave device 110-2 is connected to the input/output port 114 of the slave device 110-3 via the communication cable 120.

Reference numeral 130 is a plurality of actuators. Each of the plurality of actuators 130 is driven by the control of the slave device 110.

The EtherCAT network thus configured is operated in such a manner that in a case that the master device 100 is to transmit a predetermined data related to the driving of the plurality of actuators 130 to the plurality of slave devices 110, the master device 100 outputs the relevant data to the input/output port 104 via the communication module 102.

The data outputted by the master device 100 to the input/output port 104 is inputted to the input/output port 114 of the slave device 110-1 via the communication cable 120, whereby the communication module 112 receives and processes the data, and outputs the data to the input/output port 104a to be sequentially transmitted to the plurality of slave devices (110-2, 110-3, . . . ).

Each of the plurality of slave devices (110-1, 110-2, 110-3, . . . ) transmits to the master device 100 via the communication module 112 the data including the data of the current driving state of actuator 130.

That is, the data outputted by the slave device 110-3 is transmitted to the master device 100 sequentially via the slave devices (110-2, 110-1), and the data outputted by the slave device 110-2 is transmitted to the master device 110 via the slave device 110-1, and the data outputted by the slave device 10-1 is directly transmitted to the master device 100.

FIG. 2 is a schematic view of construction of a plurality of slave devices, where reference numeral 200 is an oscillator. The oscillator 200 generates a clock signal (CLK1) of a predetermined frequency by oscillating.

Reference numeral 210 is a processor. The processor 210 is operated in response to the clock signal (CLK1) generated by the oscillator 200, and generates a clock signal (CLK2) having a predetermined frequency. The processor 210 receives via a bus 220 and processes a data transmitted by the master device 110 and received by the communication module 112 in a case the communication module 112 generates a synchronization signal (SYNCO) to be inputted into an interrupt terminal (INT), and generates a control data for driving the actuator 130 in response to the processed data.

Reference numeral 212 is a timer embedded in the processor 210. The timer 212 is operated in response to the control of the processor 210 to set up a period capable of generating a timer interrupt, and in a case the timer interrupt is generated, the processor 210 performs the operation of the timer interrupt.

Reference numeral 230 is a driver. The driver 230 is synchronized to the clock signal (CLK2) generated by the processor 210 and operated thereby, and drives the actuator 130 in response to the control data generated by the processor 210.

The slave device 110 thus configured is such that the oscillator 200 is oscillated to generate a clock signal (CLK1), whereby the processor 210 is operated by the generated clock signal (CLK1). The processor 210 generates a clock signal (CLK2), whereby the driver 230 is operated by the generated clock signal (CLK2).

The data for driving the actuator 130 and transmitted by the master device 100 is received by the communication module 112. For example, the communication module 112 receives data included with parameters such as a position, a speed and pressure for driving the actuator 130.

In a case the EtherCAT network is connected to the plurality of slave devices 110, time for receiving the data transmitted by the master device 100 by the communication modules 112 each mounted at the plurality of slave devices 110 may generate a mutual difference due to generated physical delays.

Therefore, the communication module 112 uses a distributed clock function to calculate a time delay that is taken in receiving the data by all the plurality of slave devices 112. The plurality of communication modules 112 simultaneously generates a synchronization signal (SYNCO) in response to the calculated time delay.

The synchronization signal (SYNCO) generated by the communication module 112 is inputted into an interrupt terminal (INT) of the processor 210.

The processor 210 receives via a data bus 220 the data transmitted by the master device 100 and received by the communication module 112 in a case the synchronization signal (SYNCO) is inputted to the interrupt terminal (INT), and processes the data thus inputted to generate a control data.

The control data generated by the processor 210 is inputted to the driver 230, where the driver 230 processes the control data by being synchronized to the clock signal (CLK2) to drive the actuator 130.

FIG. 3 is a signal flowchart illustrating an operation of a processor in FIG. 2.

Referring to FIG. 3, the processor 210 first sets up a period for generating a timer interrupt, and the set-up period of the timer interrupt is counted by the timer 212 to generate the timer interrupt (S300).

The processor 210 processes the data received from the communication module 112 (S302), performs a control algorithm to generate a control data for driving the actuator 130 (S304).

Under this circumstance, the processor 210 determines whether the timer interrupt has been generated by the timer 212 (S306), and keeps waiting until the timer interrupt is generated if the timer 212 has not generated the timer interrupt.

If the timer 212 has generated the timer interrupt, the processor 210 returns to S302 to process the data received from the communication module 112 (S302), to generate a control data in response to the control algorithm (S304), and to repeatedly perform the operation (S306) of waiting until the timer interrupt is generated.

FIG. 4 is a signal flowchart illustrating a synchronization interrupt operation performed by a process of FIG. 2.

Referring to FIG. 4, a predetermined data transmitted by the master device 100 is received by the communication module 112 and generates a synchronization signal (SYNCO) using the distributed clock function. The synchronization signal (SYNCO) is to be applied to the interrupt terminal (INT), where the processor 210 is applied with synchronization interrupt.

In a case the synchronization interrupt is applied, the processor 210 receives via the data bus 220 the data received by the communication module 112 (S400), and the received reception data is processed in the step of S302. The processor 210 outputs via the data bus 220 to the communication module 112 the data of current status of the slave devices 110, and transmits the data to the master device 100 (S402) to end the operation of the synchronization interrupt.

FIG. 5 is a signal flowchart illustrating a timer interrupt operation performed by the processor of FIG. 2.

Referring to FIG. 5, in a case the timer 212 counts the period of the timer interrupt to generate a timer interrupt, the processor 210 outputs a control data to the driver 230 (S500). That is, the processor 210 outputs to the driver 230 the control data calculated in the step of S304 to allow the driver 230 to drive the actuator 130 in response to the control data. The driver 210 re-sets up a period of the timer interrupt for generating the timer interrupt (S502) and finishes the operation of the timer interrupt.

That is, the processors 210 receive the data received by the communication module 112, and transmit to the master device 110 the data of the current status of the slave devices 110, in case the synchronization interrupt by the synchronization signal (SYNCO) is generated. The processors 210 process the reception data at each period of the timer interrupt, and generate a control data for driving the actuator 130. Furthermore, whenever the timer interrupt is generated, the generated control data is outputted to the driver 230 to drive the actuator 130.

The processors 210 each mounted at the plurality of slave devices 110 are synchronized in response to the synchronization signal (SYNCO) to receive the reception data from the communication module 112 via the data bus 220.

However, the processors 210 process the reception data according to each set-up period of the timer interrupt, generate the control data and output the control data to the driver 230. The driver 230 processes the control data in response to the clock signal (CLK2) generated by the processor 210 to drive the actuator 130.

Therefore, the output of control data to the driver 230 is not synchronized due to non-synchronization of the control period of the processor 210 each mounted at the plurality of slave devices 110. At the same time, the operation of driving the actuator 130 by the drivers 230 each mounted at the plurality of slave devices 110 is not synchronized.

For example, as shown in FIGS. 6a and 6c, the operations of inputting the reception data by the slave device (110-1) and the slave device (110-2) are synchronized because the processor 210 receives the reception data from the communication module 112 via the data bus 220, in a case the communication module 112 generates a synchronization signal (SYNCO) according to the distributed clock function.

However, the processors each mounted at each slave device 110 is operated in response to each clock signal (CLK1) generated by the oscillators 200, and the reception data is processed by periods of the timer interrupts each counted by the timers 212 to generate the control data, such that, as illustrated in FIGS. 6b and 6d, each of the processors 210 processes the reception data, while the control period for generating the control data is not synchronized.

Furthermore, each driver 230 mounted at each slave device 110 is operated in response to the clock signal (CLK2), where the clock signal (CLK2) is generated by each processor 210, and as depicted in FIGS. 7a and 7b, the drivers 230 cannot process the control data using the synchronization due to non-synchronization of clock signals (CLK2) of the slave device (110-1) and the slave device (110-2), whereby there is a limit in accurately controlling the actuator 130.

FIG. 8 is a schematic structural view of a slave device in a synchronization control device according to an exemplary embodiment of the present disclosure, where reference numeral 800 is an oscillator, and the oscillator 800 is oscillated to generate a clock signal (CLK11).

Reference numeral 810 defines a communication module. The communication module 810 receives data inputted from the master device 100 via the input/output port 114, in case the communication module 810 is connected to the EtherCAT network, and stores the received data and transmits to a lower slave device 110 via the input/output port 114a. Furthermore, the communication module 810 transmits to the master device 100 or an upper slave device 110 via the input/output port 114 the data inputted from the lower slave device 110 via the input/output port 114a.

The communication module 810 generates a first synchronization signal (SYNCO10) and a second synchronization signal (SYNCO11) according to the distributed clock function. That is, in case a plurality of slave devices is connected to the EtherCAT network, each communication module 810 mounted at each slave device 110 simultaneously generates the first synchronization signal (SYNCO10) and the second synchronization signal (SYNCO11) according to the distributed clock function.

Reference numeral 820 represents a PLL (phase locked loop). The PLL generates a clock signal (CLK12) in response to the second synchronization signal (SYNCO11) generated by the communication module 810.

Reference numeral 830 is a processor. The processor 830 generates a clock signal (CLK13) in response to the clock signal (CLK11) generated by the oscillator 800. The processor 830 also generates a selection signal (SEL) according as whether the communication module 810 has generated the first synchronization signal (SYNCO10). The processor 830 is mounted with a timer 832 that counts a period of the timer interrupt, and generates a control data by performing a control algorithm in response to the timer interrupt generated by the timer 832 in a case the first synchronization signal (SYNCO10) is not inputted to the interrupt terminal (INT), and outputs the generated control data.

Furthermore, the processor 830 inputs via a data bus 840 the data received by the communication module 810 according to the first synchronization signal (SYNCO10) in a case the first synchronization signal (SYNCO10) is inputted to the interrupt terminal (INT), and performs the control algorithm to generate a control data, whereby the generated control data is outputted.

Reference numeral 850 defines a multiplexer. The multiplexer 850 selects either the clock signal (CLK13) or the clock signal (CLK12) generated by the PLL 820 in response to the selection signal (SEL) outputted by the processor 830, and outputs a clock signal (CLK14). That is, in a case the communication module 810 generates the first synchronization signal (SYNCO10), the multiplexer 850 selects the clock signal (CLK12) as clock signal (CLK14) in response to the selection signal (SEL) outputted by the processor 830, and in a case the communication module 810 does not generate the first synchronization signal (SYNCO10), and selects the clock signal (CLK14) as the clock signal (CLK13) according to the selection signal (SEL).

Reference numeral 860 refers to a driver. The driver 860 processes the control data in response to the clock signal (CLK14) selected by the multiplexer 850 to drive an actuator 870.

The synchronization control device thus configured according to the present invention is operated in such a manner that the oscillator 800 is oscillated to generate a clock signal (CLK11), and the processor 830 is operated in response to the generated clock signal (CLK11) to generate the clock signal (CLK13).

Furthermore, in a case a network is connected, the data transmitted by the master device 100 is received by the communication module 810 via the input/output port 114. The communication module 810 utilizes the distributed clock function to periodically generate the first synchronization signal (SYNCO10) and the second synchronization signal (SYNCO11).

That is, each of the communication modules 810 mounted at each slave device receives the data transmitted by the master device 100 via the input/output port 114, uses the distributed clock function to periodically generate the first synchronization signal (SYNCO10) and the second synchronization signal (SYNCO11).

The first synchronization signal (SYNCO10) is inputted to the interrupt terminal (INT) of the processor 830, and the second synchronization signal (SYNCO11) is inputted to the PLL 820 to generate the clock signal (SYNCO12).

Under this circumstance, the processor 830 generates a timer interrupt according to the period of the timer interrupt set up by the timer 832 to determine whether the first synchronization signal (SYNCO10) has been inputted to the interrupt terminal (INT).

As a result of the determination, if the first synchronization signal (SYNCO10) has been inputted to the interrupt terminal (INT), the processor 830 receives the communication module 810-received data via the data bus 840 and processes the data, executing the control algorithm to generate the control data, and outputs the generated control data to the driver 860. The processor 830 generates the selection signal (SEL) to allow the multiplexer 850 to select the clock signal (CLK12) as the clock signal (CLK14).

Accordingly, the multiplexer 850 selects the clock signal (CLK12) in response to the selection signal (SEL) and sends the clock signal (CLK12) to the clock signal (CLK14), whereby the outputted clock signal (CLK14) is inputted to the driver 860, where the driver processes the control data in response to the clock signal (CLK14), i.e., the clock signal (CLK12) to drive the actuator 870.

The present disclosure is such that, if the plurality of slave devices 110 is connected to the EtherCAT network to normally execute the communication, each of the communication modules mounted to each of the plurality of slave devices 110 simultaneously generates the first synchronization signal (SYNCO10) in response to the distributed clock function, and the processor 830 receives the reception data according to the first synchronization signal (SYNCO10) and processes the reception data and generates the control data for transmission to the driver 860.

Therefore, the processor 830 mounted at the plurality of slave devices 110 receives the reception data from the communication module 810 and processes the reception data, wherein the synchronized operation of generating the control data and outputting the control data to the driver 860 is executed.

The PLL 820 generates the clock signal (CLK12) in response to the second synchronization signal (SYNCO11) generated by the distributed clock function, and the multiplexer 850 selects the generated clock signal (CLK12) as the clock signal (CLK14) and outputs the generated clock signal (CLK12) to the driver 860.

Thereby, synchronization is executed in which each of the drivers 860 mounted at each of the plurality of slave devices 110 processes the control data to drive the actuator 870.

If the EtherCAT network cannot normally execute the communication, the communication module 810 fails to generate the first synchronization signal (SYNCO10) and the second synchronization signal (SYNCO11).

The processor 830 executes the control algorithm according to the timer interrupt generated by the timer 832 to produce the control data, because the first synchronization signal (SYNCO10) is not inputted to the interrupt terminal (INT), outputs the generated control data to the driver 860, and generates the selection signal (SEL) to allow the multiplexer 850 to select the clock signal (CLK13) as the clock signal (CLK14).

Then, the multiplexer 850 selects the clock signal (CLK13) according to the selection signal (SEL) and outputs the clock signal (CLK13) to the clock signal (CLK14), and the outputted clock signal (CLK14) is inputted to the driver 860, where the driver 860 processes the control data in response to the clock signal (CLK14), i.e., the clock signal (CLK13) to drive the actuator 870.

That is, the present disclosure is such that even if the EtherCAT network cannot normally execute the communication, the processor is able to keep driving the actuator 870 in response to the previously-received data.

FIG. 9 is a signal flowchart illustrating an operation of a processor according to a synchronization control method of the present disclosure.

Referring to FIG. 9, the processor 830 sets up a period for generating a timer interrupt (S900). The timer 832 counts the set-up period to generate a timer interrupt at every period of the timer interrupt.

The processor 830 executes the control algorithm to generate the control data (S902) and determines whether the network is connected to enable a communication (S904).

As a result of the determination, if the network is connected to enable a communication, the processor 830 determines whether the first synchronization signal (SYNCO10) is inputted to the interrupt terminal (INT) (S906), returns to the step of S902 whenever the first synchronization signal (SYNCO10) is inputted to the interrupt terminal (INT) to generate the control data using the control algorithm, and repeats the operation of whether the network has been connected.

If the network is not connected, the processor 830 determines whether the timer 832 has generated the timer interrupt (S908), returns to the step of S902 whenever the timer interrupt is generated to generate the control data using the control algorithm, and repeats the operation of whether the network has been connected.

FIG. 10 is a signal flowchart illustrating a synchronization interrupt operation of a processor according to a synchronization control method of the present disclosure.

Referring to FIG. 10, if the first synchronization signal (SYNCO10) is inputted to the interrupt terminal (INT), the processor 830 outputs the control data to the driver 860 (S1000). That is, as explained in the above, the processor 830 outputs the control data generated in S902 to the driver 860 to drive the actuator 870 in response to the control data.

The processor 830 determines whether the reception data is available at the communication module 810 (S1002), and if the reception data is not present at the communication module 810, transmits to the master device 100 via the communication module 810 the data of the present status of the slave device 110 (S1008), and terminates the synchronization interrupt operation.

Furthermore, if the reception data is stored in the communication module 810, the processor 830 receives the reception data (S1004) and processes the reception data (S1006).

The reception data processed by the processor 830 executes the control algorithm at step of S902 to generate the control data. The processor 830 transmits to the master device 100 via the communication module 810 the data of current status of the slave device 110 (S1008), and terminates the synchronization interrupt operation.

FIG. 11 is a signal flowchart illustrating a timer interrupt operation of a processor according to a synchronization control method of the present disclosure.

Referring to FIG. 11, if the timer 832 generates the timer interrupt, the processor 830 determines whether the network is currently connected (S1100).

As a result of the determination, if the network is currently connected, the control data is not outputted to a driver 960 and the timer interrupt period is re-set up (S1104) for the timer 832 to generate the timer interrupt according to the timer interrupt period thus re-set up, whereby the timer interrupt is terminated.

As a result of the determination, if the network is not currently connected, the control data generated in S902 is outputted to the driver 960 (S1102). The processor 830 re-sets up the timer interrupt period (S1104) for the timer 832 to generate the timer interrupt according to the timer interrupt period thus re-set up, whereby the timer interrupt is terminated.

That is, the present disclosure is such that if the communication module 810 outputs the first synchronization signal (SYNCO10), the control algorithm is executed according to the first synchronization signal (SYNCO10) to generate the control data, the synchronization interrupt is executed by the first synchronization signal (SYNCO10) to output the generated control data to the driver 860, whereby the communication module 810 inputs the received reception data and processes the same.

If the communication module 810 fails to output the first synchronization signal (SYNCO10), the processor 830 executes the control algorithm according to the timer interrupt to generate the control data, whereby the generated control data is outputted to the driver 860.

FIG. 12 is a schematic view illustrating synchronized operations of processors each mounted at a plurality of slave devices according to the present disclosure.

If the network is not currently connected to the communication module 810, the communication module 810 of the slave devices (110-1) (110-2) fails to generate the first synchronization signal (SYNCO10) as shown in FIGS. 12a and 12d, and fails to generate the second synchronization signal (SYNCO11) as shown in FIGS. 12b and 12c, either.

Thereafter, the processor 830 generates a control data according to the timer interrupt counted and generated by the timer 832, e.g., a control period as shown in FIGS. 12c and 12f, and outputs the control data to the driver 860, whereby operation of the processors 830 each mounted at the slave devices (110-1) (110-2) is not synchronized.

If the network is currently connected to the communication module 810, the communication module 810 of the slave devices (110-1) (110-2) generates the first synchronization signal (SYNCO10) as shown in FIGS. 12a and 12d, and generates the second synchronization signal (SYNCO11) as shown in FIGS. 12b and 12c, such that the processor 830 processes the reception data according to the first synchronization signal (SYNCO10) as shown in FIGS. 12c and 12f on the same control period to generate a control data and to output the control data, whereby the operation of the processor 830 mounted at the slave devices (110-1) (110-2) is synchronized.

FIG. 13 is a schematic view illustrating synchronized clock signals of drivers each mounted at a plurality of slave devices according to the present disclosure.

If the network is not currently connected to the communication module 810, the communication module 810 of the slave devices (110-1) (110-2) fails to generate the first synchronization signal (SYNCO10) as shown in FIGS. 13a and 13d, and fails to generate the second synchronization signal (SYNCO11) as shown in FIGS. 13b and 13c, either.

At this time, as depicted in FIGS. 13c and 13g, the processor 830 mounted at the slave devices (110-1) (110-2) generates the clock signal (CLK13) that is not mutually synchronized, and the multiplexer 850 selects the clock signal (CLK13) as the clock signal (CLK14) as shown in FIGS. 13d and 13h and inputs the clock signal (CLK13) into the driver 860, whereby the operation of the driver 860 that operates in response to the clock signal (CLK14) is not synchronized as illustrated in FIGS. 13d and 13h.

If the network is currently connected to the communication module 810, the communication module 810 of the slave devices (110-1) (110-2) simultaneously generates the first synchronization signal (SYNCO10) as shown in FIGS. 13a and 13e, and simultaneously generates the second synchronization signal (SYNCO11), whereby the PLL 820 generates the clock signal (CLK12) as shown in FIGS. 13b and 13f, and the clock signal (CLK12) generated by the PLL 820 is selected by the multiplexer 850 as clock signal (CLK14) to be inputted into the driver 860, such that operation of the driver 860 is precisely synchronized as illustrated in FIGS. 13d and 13h.

As apparent from the foregoing, the present disclosure is operated in such a manner that if the communication is executable through the network, a communication module mounted at a plurality of slave devices synchronizes the control operation of processor mounted at the plurality of slave devices, using the fact that the communication module mounted at the plurality of slave devices simultaneously generates synchronization signals according to the distributed clock function, and the operation of a driver for driving an actuator mounted at the plurality of slave devices is accurately synchronized at the same time to precisely control the driving of the actuator.

Meanwhile, although present exemplary embodiments of the disclosure are described herein with reference to synchronization of a processor and a driver mounted at a plurality of slave devices in EtherCAT network, the embodiments of the present disclosure are not limited to the EtherCAT network, the present exemplary embodiments of the disclosure can be simply applied to various networks in which a master device and a plurality of slave devices are so configured as to perform a mutual communication and the plurality of slave devices can simultaneously generate synchronization signals according to the distributed clock function.

The terminology used herein is for the purpose of describing particular embodiments only and is not intended to be limiting of the general inventive concept. As used herein, the singular forms "a", "an" and "the" are intended to include the plural forms as well, unless the context clearly indicates otherwise.

The particular embodiments disclosed above are illustrative only, as the disclosure may be modified and practiced in different but equivalent manners apparent to those skilled in the art having the benefit of the teachings herein. Therefore, equivalent alterations and/or modifications may occur to those skilled in the art based upon a reading and/or understanding of the specification and annexed drawings. It should be understood that other and further modifications apart from those shown or suggested herein, may be made within the scope and spirit of the present invention.

What is claimed is:

1. A synchronization control device of slave devices connected to a network, the synchronization control device comprising:
    a communication module configured to receive data via the network and to generate a first synchronization signal and a second synchronization signal;
    a phase locked loop (PLL) configured to generate a first clock signal in response to the second synchronization signal;
    a processor configured to generate control data and a second clock signal, wherein the control data is generated by the processor according to:
    the data received by the communication module which is input to and processed by the processor in response to the first synchronization signal when the communication module generates the first synchronization signal; and
    a timer interrupt generated according to a pre-set period when the communication module fails to generate the first synchronization signal;
    a multiplexer configured to select either the first clock signal or the second clock signal; and
    a driver configured to operate in response to the clock signal selected by the multiplexer and to drive an actuator according to the control data generated by the processor.

2. The synchronization control device of claim 1, wherein:
    is further configured to generate the first and second synchronization signals according to a distributed clock function.

3. The synchronization control device of claim 1, wherein the processor comprises a timer for generating the timer interrupt.

4. The synchronization control device of claim 1, wherein the processor is further configured to generate the control data by synchronizing to the first synchronization signal if the communication module generates the first synchronization signal.

5. The synchronization control device of claim 1, wherein the processor is further configured to generate a selection signal according to presence or absence of the first synchronization signal in order to control clock signal selection by the multiplexer.

6. A synchronization control method of slave devices connected to a network, the method comprising:
    generating, by a processor, control data and a first clock signal, wherein the processor is configured to generate the control data according to:
    data received by a communication module via a network which is input to and processed by the processor in response to a first synchronization signal when the communication module generates the first synchronization signal; and
    a timer interrupt generated according to a pre-set period when the communication module fails to generate the first synchronization signal;
    receiving, by a multiplexer, at least the first clock signal and a second clock signal, wherein the second clock signal is generated by a phase locked loop in response to a second synchronization signal when the communication module generates the second synchronization signal;
    selecting, by the multiplexer, either the first clock signal or the second clock signal;
    driving, by a driver, an actuator according to the control data and selected clock signal.

7. The method of claim 6, further comprising:
    generating, by a timer, the timer interrupt according to the pre-set period; and
    outputting the generated control data to the driver.

8. The method of claim 7, further comprising re-setting, by the processor, a generation period of the timer interrupt when the timer interrupt is generated.

9. The method of claim 6, further comprising transmitting, by the processor, data regarding a current status of the slave devices to a master device.

* * * * *